Oct. 26, 1948.　　　D. M. CLARK ET AL　　　2,452,430
QUICK DISCONNECT COUPLING
Filed Jan. 17, 1947　　　2 Sheets-Sheet 2

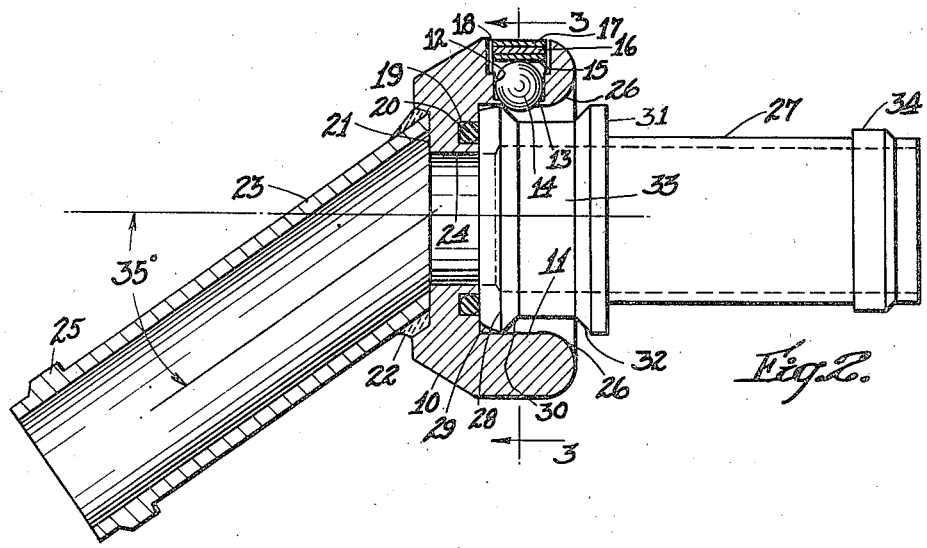
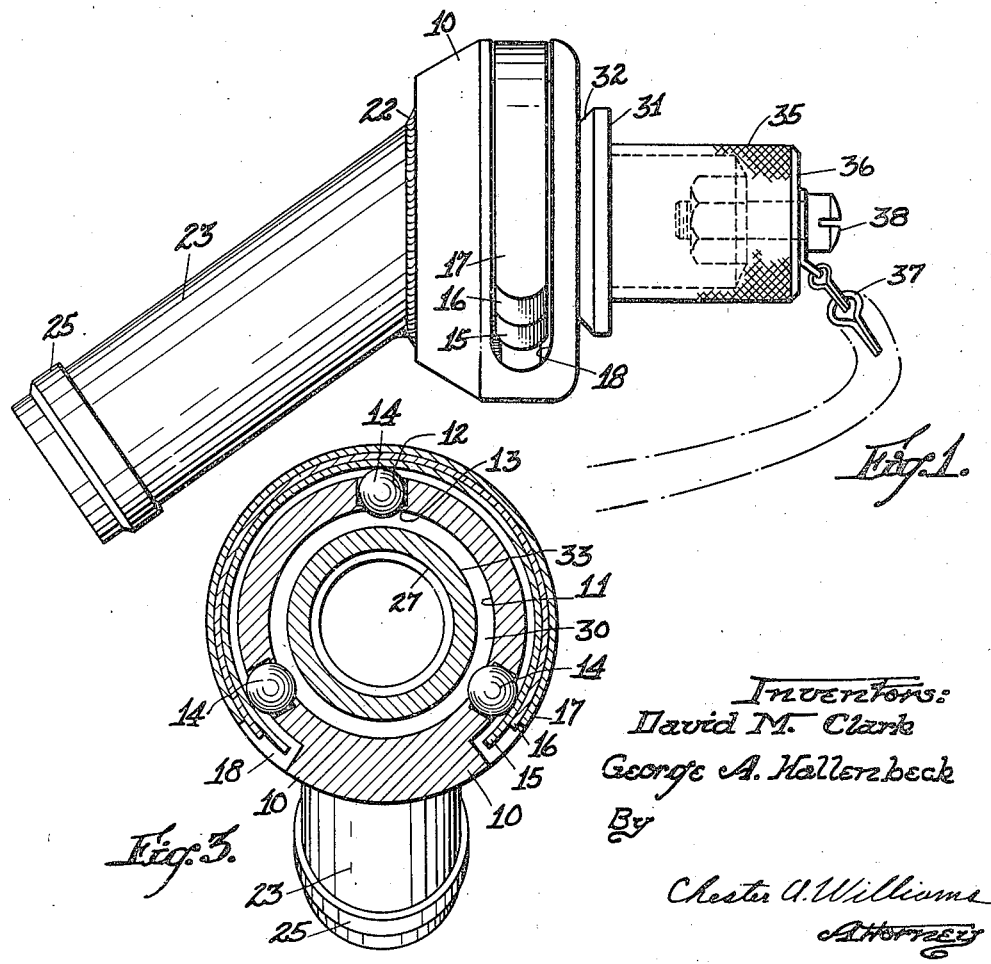

Inventors:
David M. Clark
George A. Hallenbeck
By Chester A. Williams
Attorney

Patented Oct. 26, 1948

2,452,430

UNITED STATES PATENT OFFICE 2,452,430

QUICK DISCONNECT COUPLING

David M. Clark, Worcester, Mass., and George A. Hallenbeck, Rochester, Minn.; said Hallenbeck assignor to said Clark Application January 17, 1947, Serial No. 722,550

6 Claims. (Cl. 285—97.3)

1

This invention relates to self-sealing couplings which are particularly adapted to have the component parts thereof quickly and easily connected to and disconnected from each other.

More particularly, the present invention relates to improvements in that type of coupling which is utilized for coupling together the ends of fluid-conducting tubes such as are employed in airplanes for conducting such fluids as air, oxygen and the like. For example, the pilots of high-flying aircraft employ oxygen masks which are usually connected to an oxygen supply source located remote from the pilot. Such masks are usually provided with a length of flexible hose having at its free end a coupling component which is adapted to be connected to a mating coupling component mounted rigidly at the oxygen supply source or carried at the free end of a second flexible hose which is connected directly to the oxygen supply source.

In the past many types of such couplings have been made but each of these prior devices suffered from a common fault in that to disconnect the component coupling parts it was necessary to either perform a rather complicated manual operation or to exert a force upon the both component parts in the direction of their longitudinal axes. Therefore, in the event that the pilot, in an emergency, had to jump from the plane and had not time to manipulate such a coupling, it is obvious that such a coupling would not be readily disconnected by a sidewise thrust such as would, in most cases, be exerted thereupon during such an emergency exit. Under these conditions the prior art couplings would present a source of danger as they would function to either injure the pilot or else to hinder his progress as he attempted to leave the plane. It is, therefore, an object of the present invention to provide an improved coupling which is adapted to have its component coupling parts disconnected by the exertion of a side thrust upon one of the coupling parts.

A further object of the present invention is to provide an improved coupling which is so designed that whenever the two hose elements, which are secured together by the coupling, are pulled in opposite directions, there is set up in the coupling parts a side thrust effective to pry the coupling components apart.

With the above and other objects in view, as will hereinafter appear, the invention comprises the devices, combinations and arrangements of parts, hereinafter set forth and illustrated in the accompanying drawings of a preferred embodiment of the invention, from which the several features of the invention and the advantages attained thereby will be readily understood by those skilled in the art.

In the accompanying drawings:

Fig. 1 represents a side elevation of one form of the present invention.

Fig. 2 represents a side elevation, partly in section, of the device as illustrated in Fig. 1.

Fig. 3 represents a sectional view of the device taken substantially along line 3—3 of Fig. 2.

Figure 5:
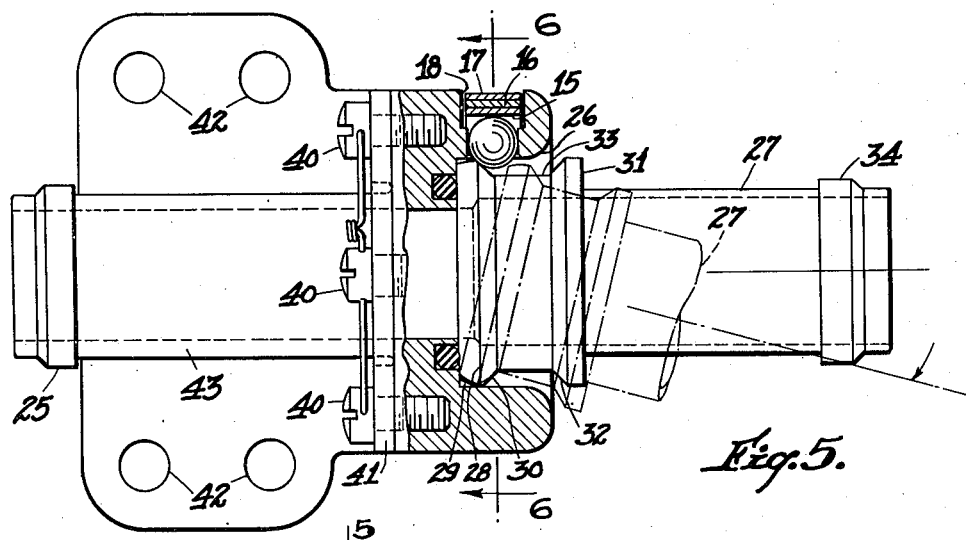
Fig. 5 represents a top plan view, partly in section, of the second form of the device taken substantially along the line 5—5 of Fig. 4 and illustrating by means of a phantom view the manner in which the coupling is broken.

Referring particularly to Figs. 1, 2, and 3, one form of the present coupling device comprises a substantially cylindrical body portion 10 which has formed therein a cylindrical bore or receiving chamber 11. Provided in the side walls of the chamber 11 are three circumferentially spaced ball-receiving apertures 12 each of which is formed with a shoulder 13 at the inner portion thereof. Disposed in each of the ball-receiving apertures 12 is a detent ball 14. The shoulder portions 13 prevent the balls 14 from dropping into the chamber 11 and the balls are held against the shoulder portions 13 by means of three inwardly biased stacked springs designated generally by the numerals 15, 16, and 17. These springs are arcuate in shape and are positioned within an arcuate groove 18 formed about the periphery of the cylindrical member 10 thereby to bias the balls 14 inwardly against their respective shoulder members 13.

The bottom portion of the chamber 11 is provided with a circular groove 19 in which is partially disposed a gasket 20 composed of rubber or other suitable flexible material. Referring particularly to Fig. 2, the left-hand face of the member 10 is provided with a circular recess 21 into which is welded, as at 22, a pipe or conduit 23. It is to be understood that one end of the conduit 23 has been cut on the bias thereby to position the conduit 23 at an angle relative to the longitudinal axis of the member 10. The hollow portion of the conduit 23 communicates directly with a cylindrical aperture 24 provided axially of the member 10. The free end portion of the conduit 23 is provided with a circular flange 25 which is adapted to function as a friction means over which a flexible hose may be placed.

Referring particularly to Fig. 2, it is to be understood that the chamber 11 has the outer peripheral portion of its inner side wall formed as a rounded shoulder 26 which blends into the outer wall of the member 10 thereby to form a substantially circular lip thereon. The member 10 with its longitudinal bore or chamber 11 functions as a female receptacle member which receives a male conduit member 27. This conduit member 27 comprises a hollow cylindrical element having a circumferential flange 28 formed about the one end portion thereof. The outer portion of the flange 28 is beveled as at 29 thereby to form a conoidal clearance surface. An inner portion 30 on the flange 28 also is formed as a conoidal surface but it is beveled in an opposite direction from the surface 29. Spaced from the flange 28 and axially of the member 27 is a guard flange 31 which has a conoidal face 32 formed thereon. Between the flanges 28 and 31 there is formed a shoulder portion 33 which has a diameter slightly greater than that of the body portion of member 27. The outer portion of the conduit 27 has formed thereon a friction flange 34 which functions in a manner similar to that of flange 25 formed on the conduit 23.

From the above description, it is to be understood that the male conduit member 27 may be connected to the female receptacle member 10 by merely inserting the flanged portion 28 into the receptacle and by forcing the same inwardly thereby to thrust the ball members 14 outwardly to the end that the flange 28 may be seated directly against the bottom portion of a chamber 11. When the male member is so seated, the balls 14, under pressure from the springs 15, 16, and 17, will move inwardly to engage the conoidal portion 30 of the flange 28. Thus, the springs 15, 16, and 17, through the agency of the balls 14, will bias the male member 27 towards the bottom portion of the chamber 11 thereby to hold the same rigidly therein. The gasket member 20 will, of course, be compressed within the groove 19 thereby effectively to seal the joint existing between the member 10 and the male member 27.

When it is desired to disconnect the hereinabove described coupling unit, it is only necessary to exert a sidewise thrust upon the member 27. Such a thrust will be effective to press one portion of the flange member 28 against the base of the chamber 11 and an opposite portion of the flange 28 will, of course, be shifted in the opposite direction thereby to force one or several of the balls 14 outwardly within the ball sets 12. Further movement of the member 27 will be effective to release it entirely from the confines of the balls 14 as adequate clearance space is provided between the inner wall of the chamber 11 and the shoulder 33 to permit the member 27 to be swung clear of the balls. Furthermore, since the sidewise thrust is exerted upon the member 27 at a point well removed from the receptacle member 10, it will be understood that a great mechanical advantage will be effected to the end that the member 27 may be readily removed from the member 10 by a relatively small force. To remove the member 27 from the receptacle member 10 by exerting a pull upon the member 27 directed along its longitudinal axis would require a relatively great force as in this case the member 27 would have to thrust simultaneously all three of the balls 14 outwardly and there would be no means for providing a lever action such as exists when a side thrust is used for disconnecting this coupling. The flange 31 and the shoulder 33 are provided about the member 27 in order to prevent the member from being inserted into the receptacle at an angle such that the member 27 could be jammed therein.

Referring particularly to Fig. 2, it is to be understood that each of the members 23 and 27 is adapted to have a hose connected thereto. Thus, due to the angular position of the member 23 relative to the receptacle member 10, in the event that the hereinabove noted hoses were pulled in opposite directions it is clear that the member 27 would be cammed out of the receptacle member 10 in a manner as hereinabove described. In other words, by placing the conduits 27 and 23 in the angular positions shown in Fig. 2, a side thrust is always effected between these members whenever a straight line pull is exerted upon the hoses which are adapted to be connected respectively to the members 23 and 27. This first form of the invention is, therefore, primarily adapted for connecting together a pair of flexible tubes or hoses. From the above description it is to be understood that the present invention provides a coupling which, although held together by forces of relatively high magnitude, may be broken by a relatively slight force to the end that it functions both as an effective fluid seal and a means whereby the hoses may be quickly disconnected.

Referring particularly to Fig. 1, the first form of the invention is illustrated as having a plug member 35 inserted into the receptacle member 10 in lieu of the male member 27 as illustrated in Fig. 2. This plug member 35 is provided with the same flanged end portions as the member 27 but at the same time its opposite end is closed as at 36 thereby to seal the opening of the member 10. A chain 37 may be secured to the end of the plug 35 by means of a bolt 38 for the purpose of retaining the plug near the coupling member while the plug is not in use.

Figure 4:
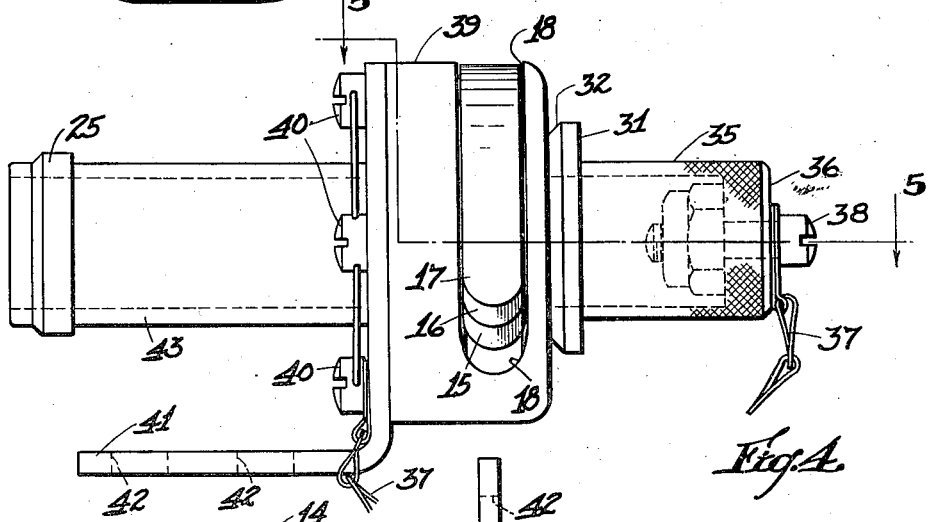
Fig. 4 represents a side elevation of a second form of the present invention.
Figure 6:
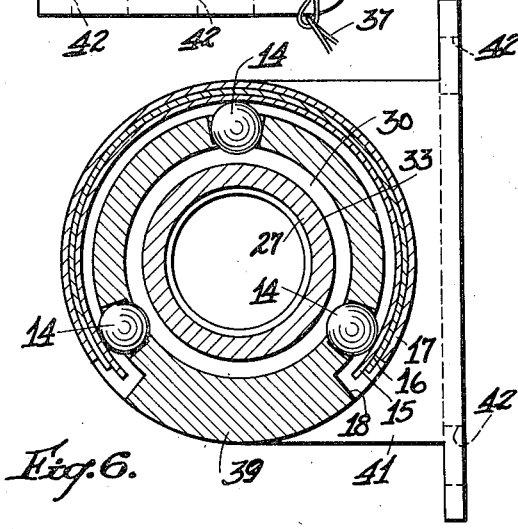
Fig. 6 represents a sectional view of the second form of the invention taken substantially along line 6—6 of Fig. 5.

Figs. 4, 5, and 6 of the present drawings illustrate a second form of the present invention. Referring particularly to Fig. 5, it will be understood that this second form of the invention differs from that form illustrated in Figs. 1 to 3 primarily in that the second form of coupling is designed to be secured upon a rigid body. With this end in view the receptacle member 10 of Fig. 2 has been replaced by a receptacle member 39 which has secured upon the left hand face thereof by means of screws 40, an angle bracket 41. This angle bracket is provided with a plurality of apertures 42 which are adapted to receive bolts which in turn function to secure the entire coupling assembly to a rigid body. Also in the present form of coupling the conduit member 23 as disclosed in Fig. 2 has been replaced by conduit member 43 which is welded or otherwise secured to the member 39 and disposed in axial alignment with the receptacle chamber 11 formed in the member 39. The remaining elements of this second form of the invention are substantially like those as used in the hereinabove described first form. Fig. 4 discloses this second form of the invention with the plug member 35 inserted therein and having the chain 37 secured by one of the bolts 40 to the angle bracket 41.

In order to disconnect the male conduit 27 from the female receptacle member 39 a side thrust is exerted upon the conduit 27, which side thrust is effective to cam the two members apart in the same manner as hereinabove described in connection with the first form of the invention. Fig. 5 illustrates, by way of a phantom view, the conduit 27 in a disconnected position just prior to being removed entirely from the female receptacle member. Referring to this figure it may be seen that the one portion of the flange 28 remains in engagement with the base of the receptacle member and functions as a fulcrum about which the member 27 pivots as it is swung about.

Thus, this second coupling is adapted to be secured to a stationary means whereas the first coupling is adapted to be supported merely by two of the hoses which are secured together by the coupling. In disconnecting the first coupling one may merely pull apart two hoses which are adapted to be connected together by the coupling or one may grasp the two conduit members 23 and 27 and apply a shearing motion thereto. In either event the coupling will be disconnected by the camming or lever action between the pivoted portion of the flange 28 and remaining portions of the flange which engage the balls 14. On the other hand, the second coupling may be disconnected by merely grasping the male member 27 and moving the same sidewise relative to the rigidly held bracket 41. From the above description it is to be understood that the present construction provides means whereby the male member is biased against the base of the female member with a relatively great force thereby effectively to seal the joint. However, due to the fact that the male member is designed to be cammed out of the female receptacle the coupling may be easily and quickly broken in spite of the high pressures which exist between the two coupling components. Furthermore, the coupling component may be pulled apart by pulling the male member 27 away from the female member and no care has to be taken to prevent a cramping of the member. A pull in any random direction is sufficient to disconnect the coupling. Thus, for example, there is never any danger that such a coupling would hinder a pilot while he is making an emergency exit from his airplane.

We claim:

1. A coupling device comprising, an outer body member having a shouldered longitudinal bore therein, an inner body member adapted to enter said bore, a circumferential flange formed about the inner end portion of said inner body member, said inner body member having an outside diameter substantially less in size than that of said bore thereby to form a clearance space therebetween, and a spring biased member carried by said outer body member and normally positioned against said flange thereby to bias said inner body member against the shoulder portion of said bore, said clearance space affording radial clearance of such magnitude as to permit the removal of said inner body member from said outer body member by a sidewise thrust exerted upon said inner body member at a point remote from said circumferential flange.

2. A coupling device comprising, an outer body member having a shouldered longitudinal bore therein, an inner body member adapted to enter said bore, a circumferential flange formed about the inner end portion of said inner body member, said flange being beveled so as to present a minimum of engageable area at the periphery thereof, said inner body member having an outside diameter substantially less in size than that of said bore thereby to form a clearance space therebetween, and a plurality of spring biased elements carried by and circumferentially spaced about said outer body member, said elements being normally positioned to bias said inner body member against the shoulder portion of said bore, said clearance space affording radial clearance of such magnitude as to permit the removal of said inner body member from said outer body member by a relative pivotal movement between said inner and outer body members in a manner such that one portion of said flange will remain in engagement with said shoulder until the other portions thereof function to cam by said spring biased elements.

3. A coupling device comprising, a body member having a longitudinal bore formed from end to end therein, a pair of tubular conduit members, each of said conduit members being normally secured to a respective end portion of said body member so as to be in communication with said bore and to have the longitudinal axes thereof form an angle of less than 180 degrees between said conduit members, and means including a spring biased element for securing one of said conduit members to said body member, said means being effective to release its associated tubular member from said body member whenever said tubular members are moved towards parallelism with each other.

4. A coupling device comprising, a body member having a longitudinal bore formed from end to end therein, a tubular conduit secured upon one end portion of said body member so as to be in communication with said bore and to have the longitudinal axis thereof form an acute angle with the longitudinal axis of said bore, a second tubular member adapted to be removably secured to the other end portion of said body member so as to be coaxially aligned with said bore, and means including a spring biased element for securing said second tubular conduit to said body member, said means being effective to release its associated tubular conduit from said body member whenever said tubular conduits are moved towards parallelism with each other.

5. A coupling device comprising, a body member having a longitudinal bore formed from end to end therein, a first tubular conduit adapted to enter one end of said bore and to be axially aligned therewith, a circumferential flange formed about the inner end portion of said first tubular conduit, means including a spring biased element carried by said body member for engaging said flange thereby to removably secure said first tubular conduit within said bore, and a second tubular conduit secured upon said body member so as to be in communication with the other end of said bore and to have the longitudinal axis thereof form an acute angle with the axis of said bore, said means being effective to release said first tubular conduit from said body member whenever said tubular conduits are moved towards parallelism with each other.

6. A coupling device comprising, a body member having a shouldered longitudinal bore formed from end to end therein, a first tubular conduit adapted to enter one end of said bore and to be axially aligned therewith, a circumferential flange formed about the inner end portion of said first tubular conduit, said first tubular conduit having an outside diameter substantially less in size than that of said bore thereby to form a clearance space therebetween, a spring biased member carried by said body member and normally positioned against said flange thereby to bias said first tubular conduit against the shoulder portion of said bore, and a second tubular conduit secured upon said body member so as to be in communication with the other end of said bore and to have the longitudinal axis thereof form an acute angle with the axis of said bore, said spring biased member being effective to release said first tubular conduit from said body member whenever said tubular conduits are moved toward parallelism with each other.

DAVID M. CLARK.
GEORGE A. HALLENBECK.

REFERENCES CITED

The following references are of record in the file of this patent:

UNITED STATES PATENTS

| Number | Name | Date |
|--------|------|------|
| 1,497,483 | Callender et al. | June 10, 1924 |